(12) United States Patent
O'Brien, V et al.

(10) Patent No.: US 11,019,010 B2
(45) Date of Patent: May 25, 2021

(54) ELECTRONIC COMMUNICATIONS IN CONNECTION WITH A PACKAGE DELIVERY

(71) Applicant: Walmart Apollo, LLC, Bentonville, AR (US)

(72) Inventors: John J. O'Brien, V, Farmington, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 154 days.

(21) Appl. No.: 15/869,476

(22) Filed: Jan. 12, 2018

(65) Prior Publication Data
US 2018/0205682 A1    Jul. 19, 2018

Related U.S. Application Data

(60) Provisional application No. 62/445,979, filed on Jan. 13, 2017.

(51) Int. Cl.
*H04L 12/58* (2006.01)
*G03H 1/00* (2006.01)
(Continued)

(52) U.S. Cl.
CPC ........... *H04L 51/10* (2013.01); *G03H 1/0005* (2013.01); *G06Q 10/0833* (2013.01);
(Continued)

(58) Field of Classification Search
CPC ..... H04L 51/10; H04L 51/046; G03H 1/0005; G06Q 10/0833; G06T 19/006; B64C 2201/128
See application file for complete search history.

(56) References Cited

U.S. PATENT DOCUMENTS 7,281,133 B2    10/2007    Ginter et al.
7,881,335 B2     2/2011    Deshpande
(Continued)

FOREIGN PATENT DOCUMENTS

WO    2015177760 A3    1/2016

OTHER PUBLICATIONS

Charles Passy, Ding Dong Your Singing Telegram is Calling, Apr. 2010, p. 2-3 (Year: 2010).*
(Continued)

*Primary Examiner* — Kevin H Flynn
*Assistant Examiner* — Ibrahim N El-Bathy

(57) ABSTRACT

A system comprises a delivery entity operating to deliver a package at a predetermined time from a first person to a second person and to provide an electronic communication between the first person and the second person that is commensurate with the delivery. An electronic display for displays a first message of the electronic communication from the first person to the second person commensurate with the predetermined time of the delivery of the package to the second person and a transmitter configured to generate and output a second message of the electronic communication generated by the second person during delivery of the package and in response to the displayed first message. An exception handling device controls the delivery entity when an unexpected event disrupts the commensurate delivery with the electronic communication, and generates and outputs instructions to the delivery entity to change the predetermined delivery time to a new delivery time.

19 Claims, 6 Drawing Sheets

(51) Int. Cl.
*G06Q 10/08* (2012.01)
*G06T 19/00* (2011.01)

(52) U.S. Cl.
CPC .......... *G06T 19/006* (2013.01); *H04L 51/046* (2013.01); *B64C 2201/128* (2013.01)

(56) References Cited

U.S. PATENT DOCUMENTS

| | | | |
|---|---|---|---|
| 9,550,577 B1 | 1/2017 | Beckman et al. | |
| 9,573,684 B2 | 2/2017 | Kimchi et al. | |
| 9,959,771 B1* | 5/2018 | Carlson | G08G 5/0039 |
| 2012/0030133 A1 | 2/2012 | Rademaker | |
| 2013/0226728 A1 | 8/2013 | Oghittu | |
| 2014/0180914 A1* | 6/2014 | Abhyanker | G01C 1/00 705/39 |
| 2014/0222206 A1* | 8/2014 | Mead | B25J 9/1697 700/259 |
| 2014/0254896 A1* | 9/2014 | Zhou | B25J 9/0006 382/124 |
| 2015/0120094 A1 | 4/2015 | Kimchi et al. | |
| 2015/0120598 A1* | 4/2015 | Fadell | G06Q 10/083 705/333 |
| 2015/0277440 A1 | 10/2015 | Kimchi et al. | |
| 2015/0302495 A1 | 10/2015 | Stuckman et al. | |
| 2015/0332186 A1* | 11/2015 | Torgersrud | G06Q 10/06311 705/7.13 |
| 2015/0356481 A1* | 12/2015 | Mains | G06Q 10/06311 705/7.13 |
| 2015/0362917 A1 | 12/2015 | Wang et al. | |
| 2016/0016664 A1 | 1/2016 | Basuni | |
| 2016/0033966 A1 | 2/2016 | Farris et al. | |
| 2016/0068264 A1* | 3/2016 | Ganesh | G08G 5/0069 701/2 |
| 2016/0196755 A1 | 7/2016 | Navot et al. | |
| 2016/0253907 A1* | 9/2016 | Taveira | G05D 1/106 701/3 |
| 2016/0257401 A1 | 9/2016 | Buchmueller et al. | |
| 2016/0351089 A1 | 12/2016 | Salem | |
| 2017/0011340 A1* | 1/2017 | Gabbai | G06Q 10/0836 |
| 2017/0045894 A1* | 2/2017 | Canoy | G05D 1/0676 |
| 2017/0110017 A1 | 4/2017 | Kimchi et al. | |
| 2018/0046187 A1* | 2/2018 | Martirosyan | G05D 1/0094 |
| 2018/0144557 A1* | 5/2018 | Seo | H04L 51/00 |

OTHER PUBLICATIONS

"Holger Pfaender, An Object Oriented Approach for Conceptual Design Exploration of UAV-Based System-of-Systems, 2003, p. 1-3" (Year: 2003).*
International Search Report and Written Opinion for PCT Application No. PCT/US2018/013468, dated Mar. 20, 2018.
International Preliminary Report on Patentability in International Patent Application No. PCT/US2018/013468, dated Jul. 25, 2019; 8 pages.
Stewart, Tyrone "Hermes adds augmented reality video messages to its parcels," Mobile Marketing, Feb. 25, 2019, https://mobilemarketingmagazine.com/hermes-play-send-augmented-reality-ar-personalised-video-delivery-messages.
"Star Wars BB-8 Droid," Vat19.com, accessed Oct. 7, 2016.
Steamfield Admin, "Arena Flowers Use Customized Video Messages to Delight Their Customers," Steamfeed.com, Mar. 20, 2015.
"Add a Personalized Video Message to your Order!" ChicFloral.com, accessed Aug. 4, 2016.

* cited by examiner

ELECTRONIC COMMUNICATIONS IN CONNECTION WITH A PACKAGE DELIVERY

RELATED APPLICATIONS

This application claims the benefit of U.S. Provisional Patent Application No. 62/445,979, filed Jan. 13, 2017 and entitled "Electronic Communications in Connection with a Package Delivery", the contents of which are incorporated herein in their entirety.

TECHNICAL FIELD

The present inventive concepts relate generally to electronic communications with two or more people, and more specifically, to interactions and communications between a sender and receiver of a package delivered to the receiver by an unmanned vehicle, a smart package, or a delivery person in possession of a mobile computing device.

BACKGROUND

Modern delivery services rely on couriers, mail trucks, and so on to deliver commercial goods, gifts, or other packages to predetermined destinations. In addition, unmanned aerial vehicles (UAVs), autonomous ground vehicles (AGVs), or other unmanned vehicles commonly referred to as drones, are being considered for delivery operations. When a recipient receives a package regardless of delivery means, the recipient may desire to contact the sender by establishing an out-of-band communication, i.e., independent of the delivery, such as a phone call, email message, short message service (SMS) message, or videoconference.

SUMMARY

In one aspect, provided is a system for electronic communication between at least two people, comprising: a delivery entity operating to deliver a package at a predetermined time from a first person to a second person and to provide an electronic communication in real-time or near real-time between the first person and the second person that is commensurate with the predetermined time of the delivery. The delivery entity includes an unmanned vehicle. The delivery entity includes an electronic display for displaying a first message of the electronic communication from the first person to the second person commensurate with the delivery of the package to the second person and a transmitter configured to generate and output a second message of the electronic communication generated by the second person during delivery of the package and in response to the displayed first message. The system further comprises an exception handling device that controls the delivery entity when an unexpected event disrupts the commensurate delivery with the electronic communication, wherein the exception handling device generates and controls the delivery entity to deliver the package at a new delivery time corresponding to a delayed delivery caused by the unexpected event.

In another aspect, provided is a method for electronic communication between at least two people, comprising: recording a first message at a first user electronic device; presenting the first message to a second user at a display on an unmanned vehicle that also delivers a package to the second user; recording a second message by the second user at the unmanned vehicle; outputting a live transmission of the second message at a time of delivery of the package to the second user; and both controlling the unmanned vehicle to deliver the package at a new time due to an unexpected event and changing the live transmission of the second message to the new delivery time.

DETAILED DESCRIPTION OF EMBODIMENTS

People who send packages or related items to friends, family, or other persons of interest to the sender via a delivery service, courier, or the like have a limited interaction or no interaction as part of the delivery process, and therefore cannot enjoy the experience of the receiver's reaction to the delivery. This is particularly true of a person receiving a gift from a delivery service, who may send a "thank you card" to the sender via a mail service or the like, or by making a separate phone call or sending an email message. Conventional communication options require additional time and thought after the recipient receives the package, since such options are independent of the delivery. As time passes, the desire for a recipient to express gratitude or other emotion regarding the receipt of the gift may diminish. Also, the separate exchange of an email or the like may be impersonal. Therefore, there is a need to provide a live transmission of communication from a recipient to a sender that is contemporaneous with and dependent on the package delivery and to compensate for unexpected occurrences in a planned delivery.

In some embodiments, a delivery vehicle provides for an interaction and communication between entities such as a sender and receiver of a package when delivering the package. The delivery vehicle may be manned or unmanned, for example, an autonomous ground vehicle (AGV), drone, or other unmanned vehicles. The delivery vehicle may display pre-recorded or live audio, video, or the like from the sender as part of a bi-directional or unidirectional transmission. These features may mimic or serve as a modern substitute for face-to-face delivery of gifts between people where the gift provider/deliverer and recipient may personally experience one another's emotions in real-time, and in connection with the delivery. Live transmissions are not limited to a sender and receiver of a package, but can be shared with other individuals or groups by permitting access by social media outlets.

In addition, a system for exception handling may be included that interacts with an artificial intelligence engine for taking action when a delivery experiences a problem by offering control and modifications for the vehicle, which can be controlled by the sender, the receiver, a third party entity, and/or a central computer involved in the transaction.

Figure 1:
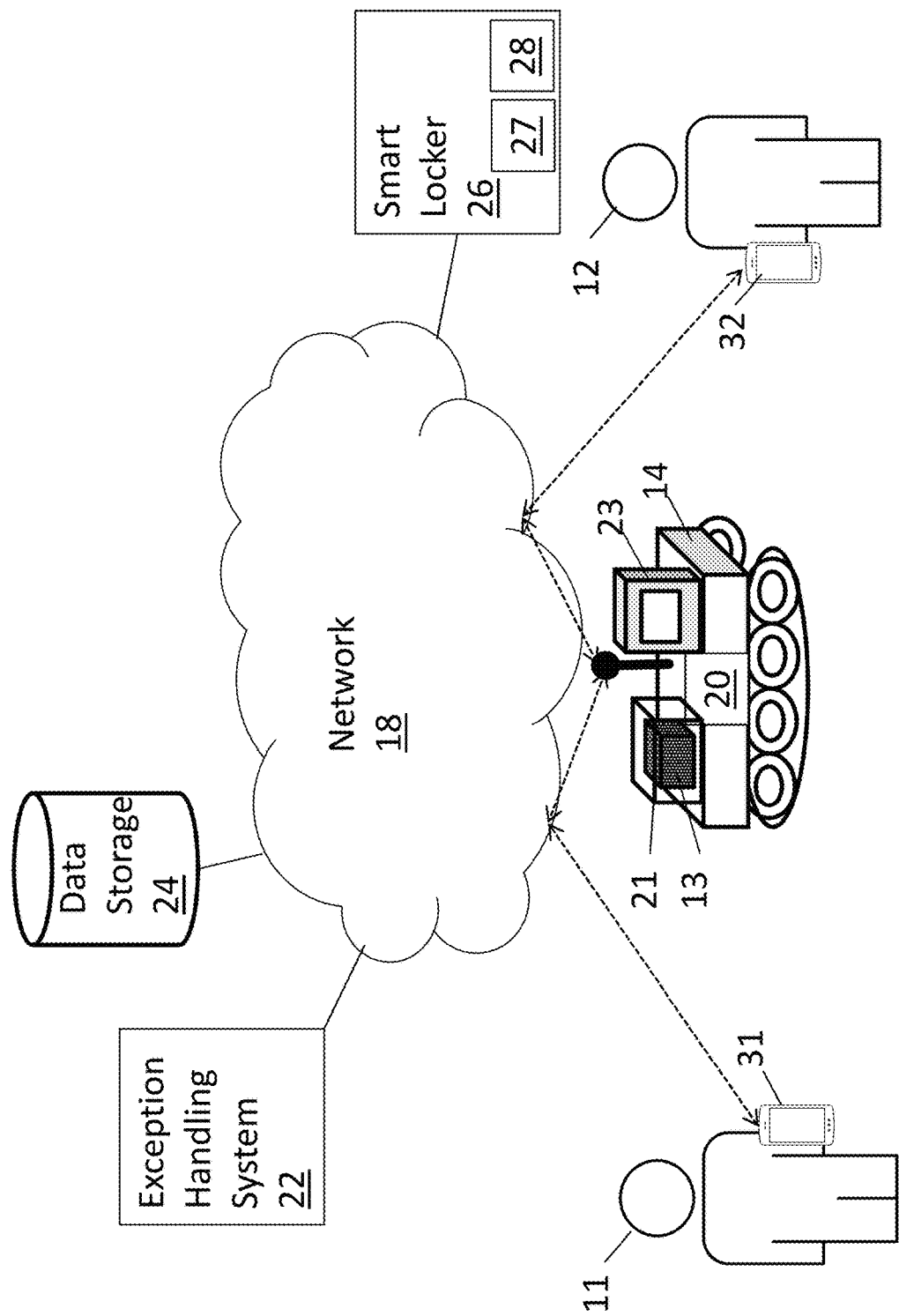
FIG. 1 is a schematic diagram of a system for exchanging electronic communications between a sender of a package and a receiver of the package during a delivery by an unmanned vehicle of the package to the receiver, in accordance with some embodiments.

FIG. 1 is a schematic diagram of a system for exchanging electronic communications between a sender 11 of a package and a receiver 12 of the package 13 during a delivery by an unmanned vehicle 14 of the package 13 to the receiver 12, in accordance with some embodiments.

The system may include but not be limited to a delivery communication and control system 20 at the unmanned vehicle 14 and an exception handling system 22. The delivery communication and control system 20 may be attached to or integrated with the unmanned vehicle 14 and therefore travel with the unmanned vehicle 14. The exception handling system 22 on the other hand may be at a remote location and include electronics for communicating with the delivery communication and control system 20 via a network 18. In other embodiments, the delivery communication and control system 20 and exception handling system 22 may be co-located, for example, at the unmanned vehicle 14.

The unmanned vehicle 14 operates to deliver a package 13 from the sender 11, also referred to as a first person or package provider, to the receiver 12, also referred to as a second person, recipient, beneficiary, and so on. Other entities may also participate in a delivery and communication, also referred to as third persons. The unmanned vehicle 14 includes a payload or delivery box 21 or the like to store the package 13 during delivery. As described herein, the delivery box 21 may include a special-purpose processor that communicates with other electronic elements of the vehicle 14, and therefore constructed and arranged as an intelligent storage unit. Here, the delivery box 21 may include a control mechanism for opening and closing a door, lid, or related cover automatically when the unmanned vehicle 14 enters a geofence region, Wifi location, or other predetermined region where the receiver 12 is located. In some embodiments, the delivery box 21 may include features similar to the smart locker 26 described herein, for example, sensors that determine if the delivery box 21 is clear for closing its payload door, informing the system of the completion of the delivery of the package 13, and so on.

In some embodiments, the unmanned vehicle 14 may deliver packages to another machine, such as a different delivery vehicle such as a train, airplane, or mail vehicle, or unmanned vehicle. The unmanned vehicle 14 may be owned and operated by a delivery service, a retail company, a crowdsource courier, or other commercial entity. Alternatively, the unmanned vehicle 14 may be owned and controlled by the sender 11 or other personal entity. The sender 11 may be a customer, company entity, crowdsourced entity, or the like. In other embodiments, the unmanned vehicle 14 is constructed to receive a package 13 from the recipient of an original package, where it can deliver the package to the original sender 11 or transfer the package 13 for further delivery to the sender 11.

The delivery communication and control system 20 is configured to facilitate an electronic communication in real-time or near real-time between a personal computing device 31 of the sender 11 and a personal computing device 32 of the receiver 12 that is commensurate with the delivery of the package(s) from the sender 11 to the receiver 12. Such communications may be exchanged through the delivery communication and control system 20 to complement or improve a conventional communication path through the network 18. The unmanned vehicle 14 may improve such communications by serving as a medium between sender personal computing device 31 and receiver personal computing device 32, for example, by routing a communication generated at personal computing 31 or 32 through an optimal path in a given communications network to the other of personal computing 31 or 32. In this manner, the unmanned vehicle 14 can function as a node between personal devices 31 and 32, or may connect either device 31 or 32 to the network with an optimal use of network forwarding technology. For example, the receiver 12 may be at a location that is separated from a cell tower by a difference that prevents the receiver's mobile phone 32 from outputting or receiving voice or text communications. The delivery communication and control system 20 may boost a communications signal to allow the receiver's mobile phone 32 to output and receive phone calls or text messages.

In some embodiments, a personal computing device 31, 32 may be a smartphone, notebook computer, laptop computer, an augmented reality apparatus, such as a Google Glass™ device), and so on. In some embodiments, the recipient 12 does not have a smartphone or other electronic device for performing a communication. However, a feature is that a computerless receiver 12 can nevertheless view messages from a display 23 of the unmanned vehicle 14 and/or send messages from the unmanned vehicle 14 contemporaneously with the delivery of the package 13 to the receiver 12.

The unmanned vehicle display 23 may be attached to or integrated with the vehicle 14, and/or can display pre-recorded and/or live transmission messages from the sender 11. In cases where a pre-recorded message is made, the unmanned vehicle 14 may be deployed to the sender's location so that the sender can provide the pre-recording directly to the unmanned vehicle 14 as an alternative to prerecording a message from a personal computer. The display 23 may include a light emitting diode (LED) display, holographic display, audio speaker, and/or other peripheral devices suitable for providing the receiver 12 with sender-related information, for example, displaying images, videos, holographs, or the like. The display 23 may obviate the need for the intended recipient 12 to communicate with the sender in an out-of-band communication using the recipient's smartphone or other communication device.

In some embodiments, the display 23 provides for authentication by a user prior to display of an electronic communication commensurate with a package delivery. Authentication can be performed at the delivery communication and control system 20 and/or other security systems by visual recognition such as facial recognition, biometric fingerprint analysis, and so on, audio recognition such as voice signatures, biometric recognition via a fingerprint or retinal scanning device (not shown) at the unmanned vehicle 14, blockchain recognition for scanning a blockchain signature or key for authentication, and so on.

The unmanned vehicle 14 may include on onboard video camera or related apparatus that is used to assist with decision making functions. For example, the video camera may be used to generate a real-time image to a central server for answers correlating to a message made by a user and the image, for example, "Is this the right door? What's the passcode to the gate?", etc. Then, either an automated response from a database 24 can be used to answer the question sent electronically from the unmanned vehicle 14 with an image or video feed or a live representative may assist the unmanned vehicle 14 with an appropriate response, or the communication feed may be parsed to the customer directly to provide a response, such as "passcode for the gate?"

Thus, the unmanned vehicle 14 can interact with the sender 11, the receiver 12, and/or third party entities to a delivery operation. In some embodiments, the unmanned vehicle 14 sends a message, for example, pages or other communication to the sender 11 when the vehicle 14 arrives at the recipient's location, and executes processes for establishing a live communication with the recipient 12. In some embodiments, the unmanned vehicle 14 sends status updates to the sender 11, for example, a status that the receiver 12 is not at the predetermined delivery location, along with an instruction for the autonomous vehicle 14 to wait for the recipient 12 or to nevertheless deliver the package 13 despite the absence of the recipient 12.

In some embodiments, the unmanned vehicle 14 communicates with the recipient 12, for example, providing controls for the recipient 12 to contact the sender 11, options for recording messages such as volume levels, recording size limits, and so on. The unmanned vehicle 14 can provide other control and modifications involved in a package delivery such as camera perspective, angle, remote unlock, or other details, which may be changed by the sender 11 or recipient 12. The sender 11, recipient 12, and/or other entity may be authorized, for example, after authentication, to reroute the unmanned vehicle, or otherwise change a planned delivery.

The exception handling device 22 controls the unmanned vehicle 14 when an unexpected event disrupts the commensurate delivery with an electronic communication between the sender 11 and receiver 12, and more specifically, between communication devices 31, 32 of the sender 11 and receiver 12, respectively, such as smartphones, telephones, mobile computers, and so on. The exception handling device 22 can communicate with the unmanned vehicle 14 to re-establish connection, communicate with a global positioning system (GPS), Wi-Fi, or other location-tracking system to provide alerts or other information as part of a communication with the unmanned vehicle 14 and/or other computing devices, such as the personal mobile devices of the 31, 32 of the sender and receiver, respectively. In some embodiments, the communication is an in-band communication, wherein exception handling and/or other control data for controlling the unmanned vehicle may be part of a same communication path as sender's personal computing device 31 and/or the receiver's personal computing device 32, and the unmanned vehicle 14. Accordingly, communications exchanged between sender 11 and receiver 12 with respect to a package delivery includes the unmanned vehicle 14 as part of the communication path, as distinguished from a well-known phone call or other data communication exchange directly between the computing devices 31, 32.

In some embodiments, the exception handling device 22 addresses scheduling issues, such as when the unmanned vehicle 14 arrives at a home and the homeowner is not home. Here, the unmanned vehicle 14 can transmit information to the package sender. In this manner, the unmanned vehicle 14 provides exception handling for default communication when an intended receiver of the package is not home or is otherwise unavailable. Another exception may include a refusal by an intended receiver 12 to receive the package 13 or to participate in a live transmission with the sender 11. In the foregoing examples, elements of the exception handling system are built into the artificial intelligence processors of the unmanned vehicle, which are configured to be trained to recognize particular recipients, and distinguished from other humans or objects, or to recognize anomalous events, such as a fallen tree in front of the recipient's home and blocking a predetermined pathway that is no longer passible by the unmanned vehicle 14. However, in some circumstances, some overrides or exceptions may require information and/or approval from a central host computer, such as a refusal of service.

The exception handling system 22 may communicate with a location detection service, such as a GPS service to receive dynamic status information about a particular delivery route. The unmanned vehicle 14 may be configured to navigate to the receiver 12 by a different path than an original planned path according to information received and processed by the exception handling device 22, for example, in connection with the onboard sensors and/or artificial intelligence technology. Options may also be provided for the user such as a sender or receiver of the package, who may control the unmanned vehicle 14 from a personal computing device or by hand gestures or audio commands that are sensed and processed.

Figure 2:
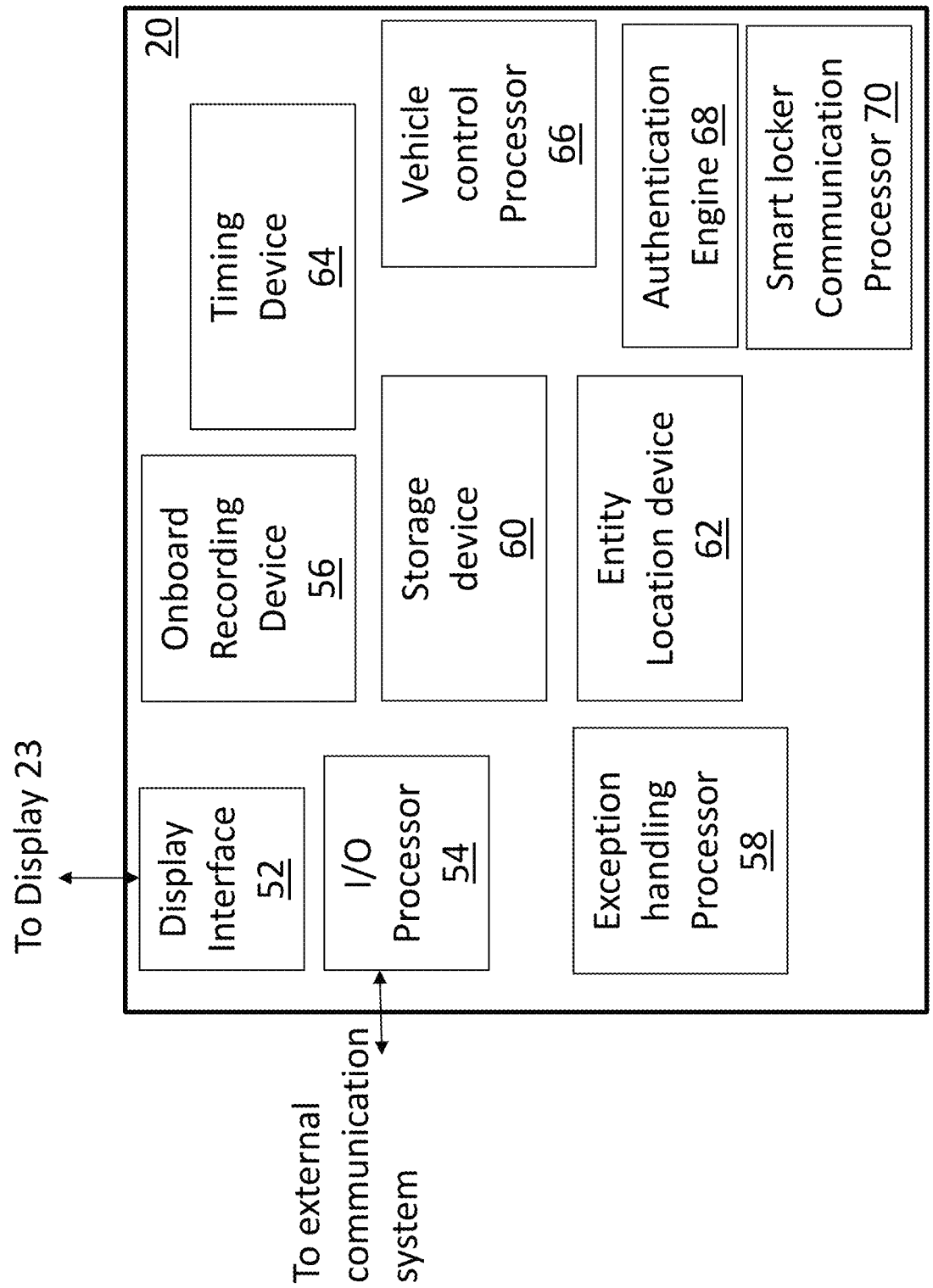
FIG. 2 is a block diagram of components of an unmanned vehicle communication and control system, accordance with some embodiments.

As shown in FIG. 2, the delivery communication and control system 20 may include but not be limited to one or more of an electronic display interface 52, an input/output (I/O) processor 54, an onboard recording device 56, an exception handling processor 58, a storage device 60, an entity location device 62, a timing device 64, a vehicle control processor 66, an authentication engine 68, and a smart locker communication processor 70.

The electronic display interface 52 is constructed and arranged to provide images, videos, holographic messages, and so on between the sender's personal computing device 31, the receiver's personal computing device 32, and the integrated display 23 of the unmanned vehicle 14.

The electronic display interface 52 functions as a medium for viewing messages at the display 23. For example, the electronic display interface 52 allows users to display both holographic and audio inputs/outputs gathered from the messages. The electronic display interface 52 allows users to share these messages through a network 18, and may further allow these messages to be stored within the cloud structure. The network 18 may be a local area network (LAN), a wide area network (WAN), wireless network, and/or any other electronic communication exchange environment. In some embodiments, the network 18 includes a cloud computing network. The electronic display interface 52 allows users to transmit via electronic devices messages via a data storage device 24 of a cloud computing environment or other network configuration and will further allow these messages to be stored within the cloud structure. The data storage device 24 includes data repository for storage of messages, which may connect with smart devices, computers, or other devices that can access and play messages from sender 11 or receiver 12. The electronic display interface 52 allow users to share these messages with social media outlets and other sources for further viewing by other individuals and groups.

The I/O processor 54 is constructed and arranged to exchange communication data via the network 18, for example, exchanging messages between the sender's personal computing device 31, the receiver's personal computing device 32 or exchanging event-related data with the exception handling system 22. The I/O processor 54 may therefore facilitate electronic communications between the sender 11 and the receiver 12, and/or other third party participants 15.

I/O processor 54 provides a medium for viewing transmissions at the unmanned vehicle 14 (FIG. 1) or smart package (FIG. 3), or other delivery means. In particular, the I/O processor 54 may include an interface allowing users to display inputs and/or outputs related to various media including but not limited to holograph, video, audio, or a combination thereof. The I/O processor 54 may also communicate with a cloud computing environment of the network 18, for example, to store transmissions at a data repository 24. In some embodiments, a public distributed ledger may be provided for sharing and storing data regarding an interaction with the autonomous vehicle 14 and a central server (not shown) at the cloud network 18. The I/O processor 54 may further allow users to share these transmissions with social media outlets or other sources for further viewing by other individuals or groups, for example, third party individuals 15 shown in FIG. 3.

The onboard recording device 56 is constructed and arranged to record messages that will allow users to make unique customizations to their messages, such as but not limited to the following: customizable backgrounds, voice adjustments, picture adjustments, text-based messages, emoticon messages, or a combination thereof.

The exception handling processor 58 is constructed and arranged to automatically execute an exception handling technique when an unexpected event is detected as part of a planned delivery, for example, a communication failure, mechanical issue, or other event that prevents an item 13 from being delivered to a recipient 12 and/or impacts the recipient's ability to communicate with the sender during the delivery and/or an event where delivery cannot be made or the recipient 12 is unavailable. The exception handling processor 58 establishes communications with the exception handling system 22. The exception handling system 22 located in the cloud network can reestablish a communication. The exception handling system 22 can provide information beyond that of the artificial intelligence information in some cases, for example, when a determination is made by the system that the home owner is not home, where are other possible locations for a different exchange, a home owner refuses package, and so on.

The exception handling processor 58 may receive instructions from the sender 11 of a package 13, for example, commands such as stop, wait, pan camera, and so on output from the sender's smartphone 31. If the system establishes that the recipient 12 is not available for receiving the package 13 at a predetermined time and location when the vehicle 14 arrives, the exception handling processor 58 can execute a condition for addressing this exception, such as executing an instruction to leave a prerecorded message stored at the storage device 60, or to instruct the vehicle 14 to remain idle at the recipient's location until contact is established with the recipient 12, or attempt to reestablish communication with the sender 11 when contact has been made with the recipient 12.

The entity location device 62 tracks location status information so that live transmissions or prerecordings are timely established for the entity at the destination location, i.e., recipient 12 or sender 11. The entity location device 62 is configured to provide real-time or near real-time routing information when navigating to or from a delivery location. The entity location device 62 can communicate with an on-board navigation of the unmanned vehicle 14. In some embodiments where the vehicle 14 is constructed and arranged to communicate with the receiver's computing device 32, the vehicle 14 can determine from a GPS device or other location finder feature of the receiver's computing device 32 to determine a current location of the receiver 12. In some instances, the receiver 12 may not be at the intended location where the package is to be received. The entity location device 62 may determine this change in location and communicate with the exception handling processor 58 to change the intended location to the location of the receiver's computing device 32.

The timing device 64 is configured to permit the sender 11 to control the timing of a delivery of the package 13 to the recipient 12. The timing device 64 may receive instructions from the exception handling system 22 to change a delivery time from an original, planned tie to a new time, for example, when the recipient 12 is determined to be unavailable at the time of the original time. The timing device 64 may communicate with the vehicle control processor 66 to change the movement of the unmanned vehicle 14 (FIG. 1), or to generate a notification to a courier (FIG. 3) to deliver the package 13 at a different time. The different time may be established by an automatic extension of time, for example, automatically extending the planned delivery time by 1 hour when an unexpected event is detected. Alternatively, the different time can be received by an external source. For example, the recipient 12 can send an electronic message that the recipient will be 30 minutes late, and this information can be processed so that the unmanned vehicle 14 delivers the package at the new time.

The authentication engine 68 can perform authentication by visual recognition such as facial recognition, biometric fingerprint analysis, and so on, audio recognition such as voice signatures, biometric recognition via a fingerprint or retinal scanning device (not shown) at the unmanned vehicle 14, blockchain recognition for scanning a blockchain signature or key for authentication, and so on.

The smart locker communication processor 70 is constructed and arranged to communicate with a smart locker 26 or other delivery box for receiving the package 13, for example, when the intended recipient 12 is unavailable for personally receiving the package 13, or when the intended recipient 12 requests a storage location for the package 13. In some embodiments, as shown in FIG. 2, the smart locker 26 is co-located with the recipient 12. In other embodiments, the smart locker 26 is part of the unmanned vehicle 14, and holds the package 13 for delivery to the recipient 12. Here, the smart locker 26 includes its own special-purpose processors for providing features in addition to those offered by the delivery communication and control system 20. In other embodiments, some or all components of the delivery communication and control system 20 are included with or otherwise in electronic communication with the smart locker 26.

In some embodiments, smart locker 26 includes a control mechanism 27 for opening and closing a door, lid, or related cover, and may control robotics or other mechanical devices that open, close, lock, and/or unlock the smart locker 26, which may operate in response to a control signal received by the smart locker communication processor 70, the exception handling system 22, a user computing device 31, 32, or a combination thereof. In some embodiments, sensors 28 determine if the smart locker 26 is clear for closing its payload door, for example, to ensure that the door is not accidentally closed on a person or object, or to confirm the receipt and presence of the package 13, thereby informing the system of the completion of the delivery of the package 13. In some embodiments, the smart locker communication processor 70 include a beacon or related device for communicating with the smart locker 26 to permit the smart locker 26 to receive the beacon emitted from the unmanned vehicle 14, whereby the door on the smart locker 26 may be unlocked and opened when the delivery boxy 18 receives the unmanned vehicle's beacon. Other tracking devices may be used such as ultra-wideband (UWB), Wi-Fi, LIDAR, geofence, Bluetooth, beaconing technologies, and so on.

In some embodiments, the smart locker 26 includes security devices such as electronic locks and the like, which may communicate directly with the authentication engine 68 to perform one or more operations described herein with respect to the authentication engine 68. The beacon on the unmanned vehicle 14 may include an authorization identifier, key, and so on that permits the package recipient 11 to authorize for the package delivery. In some embodiments, the beacon is part of the smart locker 26 that allows the unmanned vehicle 14 to authorize the delivery of the package 13. In a dual validation situation, both the unmanned vehicle 14 and smart locker 26 has a beacon, both of which may a correct and complete package delivery. In some embodiments, the unmanned vehicle 14 and smart locker 26 may communicate with each other via Bluetooth™ or other signaling method. Here, a Bluetooth™ communication may permit the smart locker 26 to send its identifier to the unmanned vehicle 14, and for the unmanned vehicle 14 to provide its identifier for confirmation of the identity of the unmanned vehicle 14 for security reasons.

In some embodiments, the smart locker 26 may also include a delivery encryption system comprising a blockchain for package tracking and authentication. Package tracking by blockchain may include elements including but not limited to location, supply chain transition, authentication of the courier and customer, ambient temperature of the container, temperature of the product if available, acceptable thresholds for ambient temperature of the product, package contents placed in the container system (products & goods), or a combination thereof.

The blockchain may include an ongoing chain hashed with key addresses along the chain of custody, including hashing with a seller private key address, a courier private key address and a buyer private key address, but not limited thereto. The package 13's key may be included with a chain of custody, which may provide age-specific access for the product or person-specific access for the package 13 and/or temperature requirements for the product and ambient environment required, or special handlings.

The authentication engine 68 located at the unmanned vehicle 14 and/or part of another computer server or processor may register items to be delivered and placed within the inner volume of the smart locker 26; and may track, register, and authenticate items delivered to the smart locker 26. Initiation of this system may begin at two different points that converge, namely, a scheduled and accepted delivery and a product key and related information. Both the delivery and the package 13 establish a blockchain, which converge when the package 13 and delivery have been established. In some embodiments, the smart locker 26, or more specifically a computer processor of the smart locker 26, may then retrieve specific handling information (temperature, etc.) from either the package 13's blockchain or from a central server, which will provide a block of information related to the package 13's specific handling. Then, as the package 13 is in transit to the delivery location, the smart locker 26 may monitor via sensors 28 information on the package's status (temperature, etc.). The smart locker 26 and/or computer in communication with the smart locker 26 may supplement the delivery blockchain with information on the product's status, and further adjust its internal conditions (temperature, etc.) based on the findings of the product's status as well as the appropriate conditions that must be met. This information may continuously update the block of information, creating additional blocks subsequent to the original, which will be distributed to the peer-to-peer ledger system executed at least in part by the authentication engine 68. Authentication and access may be restricted to specific blockchain keys to access the contents of a package 13, and may include specific times and locations, which may be changed due to the exception handling features of the system, and automatically establishing a communication, i.e., a thank you message, from the recipient 12 to the sender 11. Access to the contents may be determined at the scheduling a delivery or products. Alternatively, access may be determined while a product moves through the supply chain, such as courier acceptance, package transition from courier to home, package drop off at the home, etc.; all of which will require the original authenticated person such as the sender 11, to access the original blockchain on the peer-peer system, and may make changes to the access and authentication.

Figure 3:
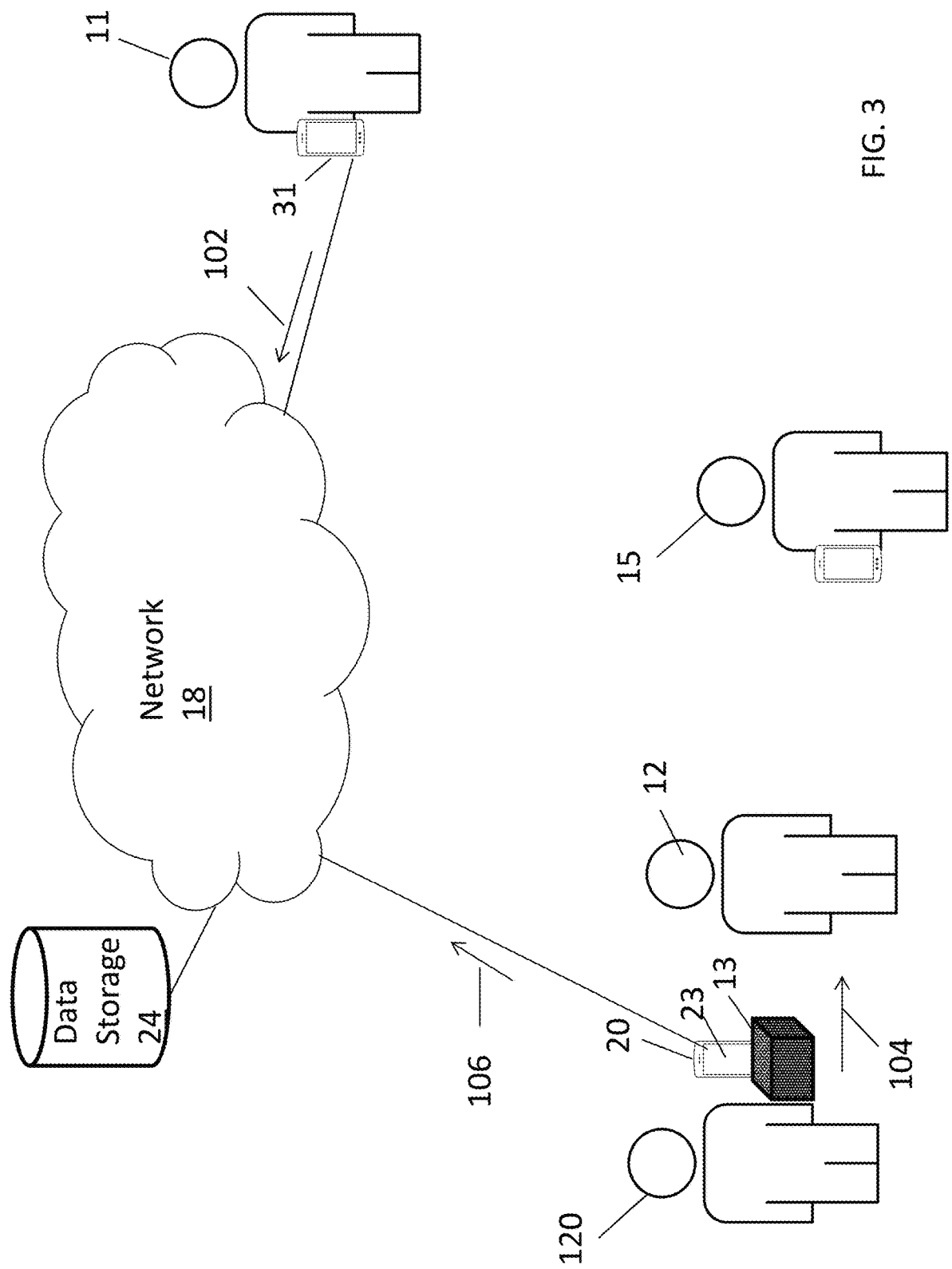
FIG. 3 is a schematic diagram illustrating a delivery of a package to a recipient, in accordance with some embodiments.

FIG. 3 is a schematic diagram illustrating a delivery of a package 13 to a recipient 12 by a courier on behalf of a provider 11 of the package 13, in accordance with some embodiments. In describing FIG. 3, reference may be made to elements of FIGS. 1 and 2.

In some embodiments, prior to delivery, the sender 11 of the package may prerecord a message for the intended receiver 12, for example, a digital photograph, video, audio, holograph, and so on, which may be transmitted (step 102) from a personal electronic device 31, for example, a digital camera, smartphone, or the like, or from the onboard camera or other recording device 56 of the unmanned vehicle 14 or courier smart device. In another example, the sender 11 produce a live transmission for the recipient 12 stating that the sender 11 personally placed the package 13 on the vehicle 14 and that the package is on its way to the receiver 12. The transmitted media may be transmitted to and stored at a data storage device 24 at a cloud computing environment. Subsequently, the stored media, e.g., messages, may be transmitted to the delivery communication and control system 20, for example, stored at a storage device 60 of the system 20. The system 20 can then present the transmitted media on a display 23 for viewing by the intended receiver 12 according to the timing device 64 at or near the same time as the delivery of the package 13. In some embodiments, the delivery communication and control system 20 is collocated with the display 23, for example, as part of a smart package apparatus, mobile apparatus carried by a human courier, and/or unmanned vehicle 14.

At step 104, the package 13 is delivered to the intended recipient 12 by a delivery entity 120. When the package 13 is received, the recipient 12 can view the prerecorded transmission (102) at the display 23. FIG. 3 illustrates that a delivery entity 120 may be a person, for example, a human courier such as a mail delivery person. In other embodiments, the delivery entity 120 includes an unmanned vehicle that is similar to or the same as the unmanned vehicle 14 described in FIGS. 1 and 2. In other embodiments, the delivery entity 120 includes a "smart package," or smart device which includes some or all of the delivery communication and control system 20 described in FIGS. 1 and 2. A smart package may also include the item(s) 13 intended for delivery. Regardless of the type or form of delivery entity, the delivery entity 120 includes some or all of the delivery communication and control system 20 for facilitating communications between the sender 11, recipient 12, and/or third party participants 15. An example of a third party participant 15 may be the grandparents of a child who receives a birthday present, where the grandparents desire to participate in an interaction with the child as part of the delivery of the gift.

At step 106, the recipient 12 can record a transmission. Here, a digital photograph, video, audio, holograph, and so on, can be generated and stored at the delivery communication and control system 20, in particular, the onboard recording device 56. Thus, the recipient 12 does not require a digital camera or other recording device and can instead record a transmission from a smart package, unmanned vehicle, or other apparatus having the delivery communication and control system 20. In some embodiments, the recipient 12 is not present when the package 13 arrives from the courier 120, unmanned vehicle 14, or other delivery vehicle. Here, the recipient 12 may record a transmission at a different electronic device, which is output to the cloud computing environment, and stored at data storage device 24, then subsequently provided to the sender 11, who can access the transmission remotely via the personal computing device 31. Alternatively, the transmission may be a live transmission. A media transmission provided by the sender 11 at step 102 or the receiver at step 106, may be stored at the data storage 24 and accessible by social media outlets, podcasts, or other sources for further viewing by the sender 11, receiver 12, and/or other individuals or groups, for example, third party individuals 15. In some embodiments, a third party individual 15 may transmit a digital photograph, video, audio, holograph, or other media, which may be stored at the data storage device 24 or output in a live transmission to the sender 11 and/or receiver 12.

In some embodiments, the unmanned vehicle 14 is configured to deliver packages to multiple receivers at different locations. Here, the unmanned vehicle 14 receives information regarding each destination location, which package(s) to be delivered at each location, and so on. In the event that an intended receiver of a package is not home or otherwise available for receiving the delivery and a corresponding electronic communication such as a prerecorded message or live transmission, the unmanned vehicle 14 may automatically move to the next identified location, complete a delivery at the next location, then return to the previous location for another attempted delivery. In some embodiments, the system allows for two unmanned vehicles 14 to facilitate a delivery operation, wherein an unmanned vehicle 14 could be deployed at both a sender location and a receiver location, thereby capturing the information received from either end and displaying it in a live transmission.

Figure 4:
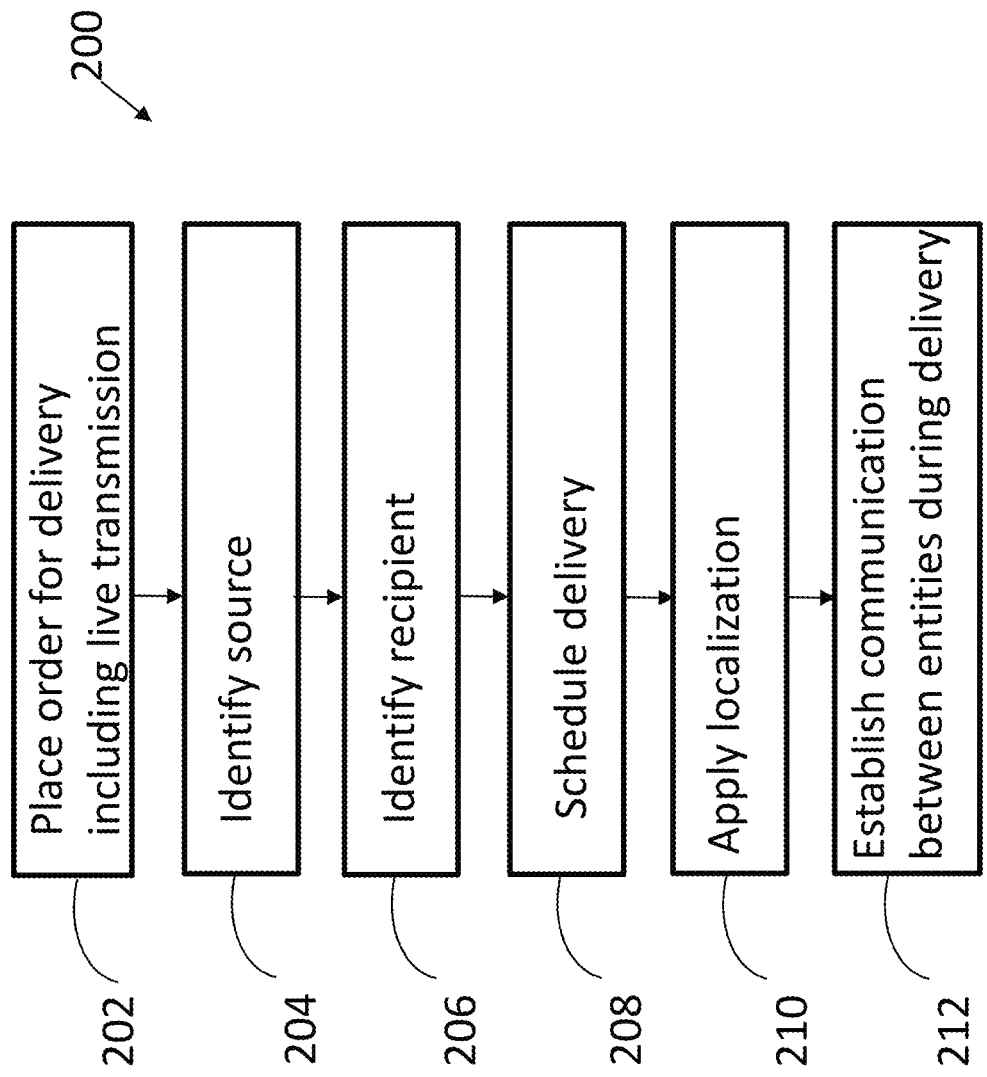
FIG. 4 is a flow diagram of a method for delivering a physical item to an intended recipient at a predetermined destination, in accordance with some embodiments.

FIG. 4 is a flow diagram of a method 200 for delivering a physical item to an intended recipient at a predetermined destination, in accordance with some embodiments. In describing the method 200, reference is made to elements of FIGS. 1-3. For example, some or all of the method 200 may be performed at elements of a system of FIG. 1-3.

At block 202, an order is placed for delivery. The delivery is ordered to include a live transmission of a message, for example, described in embodiments herein.

At block 204, a source is identified for the delivery. For example, a source may include but not limited to a mobile entity, which may include dynamic localization, and create a rendezvous location for package transfer. An example of dynamic localization may include when the unmanned vehicle 14 attempts to exchange a package that doesn't have a static location, such as a moving vehicle or person. The unmanned vehicle 14 may request information from the moving object on its current coordinates as well as its direction of travel, speed, intended destination, etc. The unmanned vehicle 14 may need to communicate a spot where it could meet the object, which would consider the speed of the object, its distance from the unmanned vehicle 14, its intended destination, and the speed of the unmanned vehicle 14. Once the unmanned vehicle 14 has identified a rendezvous location through these factors, it will then send information to either the vehicle or person regarding the rendezvous location. This may include a handoff between the unmanned vehicle 14 and another vehicle.

A location, availability of the item(s) for delivery, time slot for delivery, or a combination thereof, of the source may be determined and processed by one or more elements of a system of FIG. 1 or 3. This source information may be part of an electronic record stored at the data storage device 24, and used by the unmanned vehicle or other electronic processing device of a courier to deliver items identified for a particular delivery order.

At block 206, a recipient is identified. Recipient delivery information may be stored at the data storage device 24, for example, part of a cloud computing environment, delivery service system, or other data repository. The recipient delivery information may include electronic records including location, availability of product, time slot for delivery, and/or other relevant information used by the unmanned vehicle or other electronic processing device of a courier to deliver items identified for a particular delivery order.

At block 208, a delivery is scheduled based at least in part on the source information and recipient delivery information determined at blocks 204 and 206, respectively, and stored at data storage device 24. In some embodiments, a courier management system identifies and defines suitable arrangements for a customer to receive drop offs or pickups. An alignment for delivery times may include aligning with both the availability of a courier and delivery vehicles (e.g., unmanned vehicles) as well as the suitable times defined by the customer.

At block 210, localization is applied. Localization may be applied to define the location of a point in the system. For example, when the order is placed for delivery, the location of that delivery is also denoted. Then, when a courier is found, the courier's location as well as the customer is transferred. Then, when the courier is arranging for a drop off or for a rendezvous for the package, the location is again transferred.

At block 212, an electronic communication, in particular, a live or near-live transmission is established between the sender 11, receiver 12, courier system, in particular, for example, the unmanned vehicle 14 of FIG. 1 or a courier smart device of FIG. 3.

Figure 5:
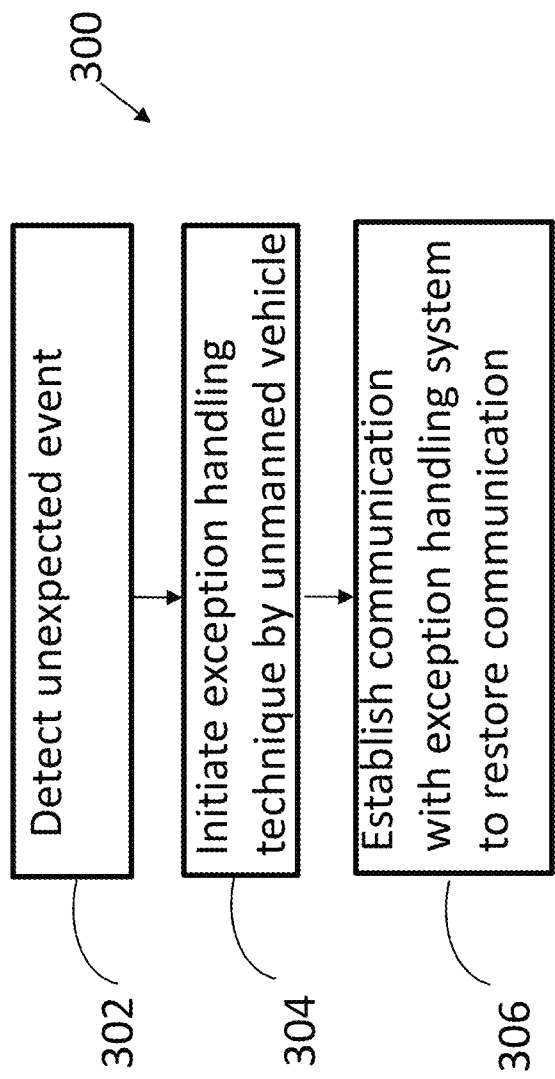
FIG. 5 is a flow diagram of a method for exception handling in a delivery and contemporaneous electronic communication between parties of the delivery, in accordance with some embodiments.

FIG. 5 is a flow diagram of a method 300 for exception handling in a delivery and contemporaneous electronic communication between parties of the delivery, in accordance with some embodiments. In describing the method 300, reference is made to elements of FIGS. 1-3. For example, some or all of the method 300 may be performed at elements of a system described with reference to some embodiments.

At block 302, an unexpected event, or exception, is detected. In some embodiments, an exception may be that the recipient is not home when the autonomous vehicle 14 or other courier arrives at the predetermined recipient location, for example, the recipient's home. This exception may be determined by the failure of the recipient to retrieve the delivered package from the vehicle 14. In other embodiments, an exception may relate to a communication failure during a live transmission. In some embodiments, when the unmanned vehicle 14 is not receiving packages from an internet or e-commerce purchase or cannot send packages through the internet, or when the AGVs signal strength is too low for transmission, a live transmission is disrupted, which may be detected by internet protocol systems of the artificial intelligence processor of the unmanned vehicle 14, or from computer network devices such as a network interface device (NIC), wireless device, and so on.

In other embodiments, an exception may relate to a mechanical failure or other event that prevents the unmanned vehicle 14 from reaching the destination at a predetermined time, for example, according to a record generated for a particular delivery and stored at the data storage device 24.

At block 304, an exception handling technique is initiated by the autonomous vehicle, in particular, the exception handling processor 58 of the delivery communication and control system 20 implemented at the unmanned vehicle 14. In one example, the exception handling processor may automatically attempt to reestablish a connection. For example, the unmanned vehicle 14 may be controlled according to the exception handling technique triggered in response to an external exception handler that also communicates with the user's electronic devices whereby the motor, drive train, computer system, propulsion system, or other components of the unmanned vehicle 14 are controlled to reduce or accelerate a movement of the unmanned vehicle 14 so that a new delivery time is achieved due to an unexpected event.

As mentioned with respect to FIG. 1, the unmanned vehicle 14 may act as a medium between personal computing devices 31 and 32, either directly or as a relay to a network which combines the connections. Here, the unmanned vehicle 14 can receive or determine if the connection has been dropped between the two devices 31, 32. Subsequently, the unmanned vehicle 14 may attempt to reestablish a connection through the same protocols it used at the original connection. In some embodiments, the unmanned vehicle 14 can use its onboard video, holographic, audio inputs and outputs, microphones, etc., to facilitate interaction between the sender and the receiver. The customer can use the unmanned vehicle 14 or could use their own personal device. In another example, the unmanned vehicle 14 outputs a live transmission of an electronic message, e.g., audio, video, holograph, to any entity in the transmission, for example, to the recipient's smartphone 32. In another example, the unmanned vehicle 14 may output location information, for example, via a GPS signal, between entities for tracking. In another example, current GPS coordinates may be shared that the unmanned vehicle 14 has with the sender and receiver, and distributed through a network, which includes packets of information relating to the coordinates the unmanned vehicle 14 has shared. Such information can be exported to other data storing devices and/or services. This may also include destination coordinates, such as an unmanned vehicle 14 isn't at the destination but intends on being at the destination (such as a home address). An intuitive map may be shared with real-time tracking, much like an UBER application, demonstrating where the unmanned vehicle 14 position is in relation to a map.

In another example, the unmanned vehicle 14 may output a notification in the form of an electronic message denoting that the communication has been interrupted. One or more of these examples may be performed at block 306, where a communication is established between the delivery communication and control system 20 and the exception handling system 22.

In some embodiments, an unmanned vehicle 14 may be used to retrieve the item from the sender 11 and deliver it to the receiver 12. The same unmanned vehicle 14 may deliver the package 13 from the sender 11 to the receiver 12. Alternatively, one unmanned vehicle 14 may retrieve the package 13 from the sender while one or more different vehicles are used to complete the delivery to the receiver 12. For example, an unmanned vehicle 14 may retrieve the package 13 from the sender 11 and deliver it to a base or delivery location, where the package 13 is transferred from the unmanned vehicle 14 to an airplane, boat, truck, mail carrier, or "mothership", and so on for delivery to its final destination.

Figure 6:
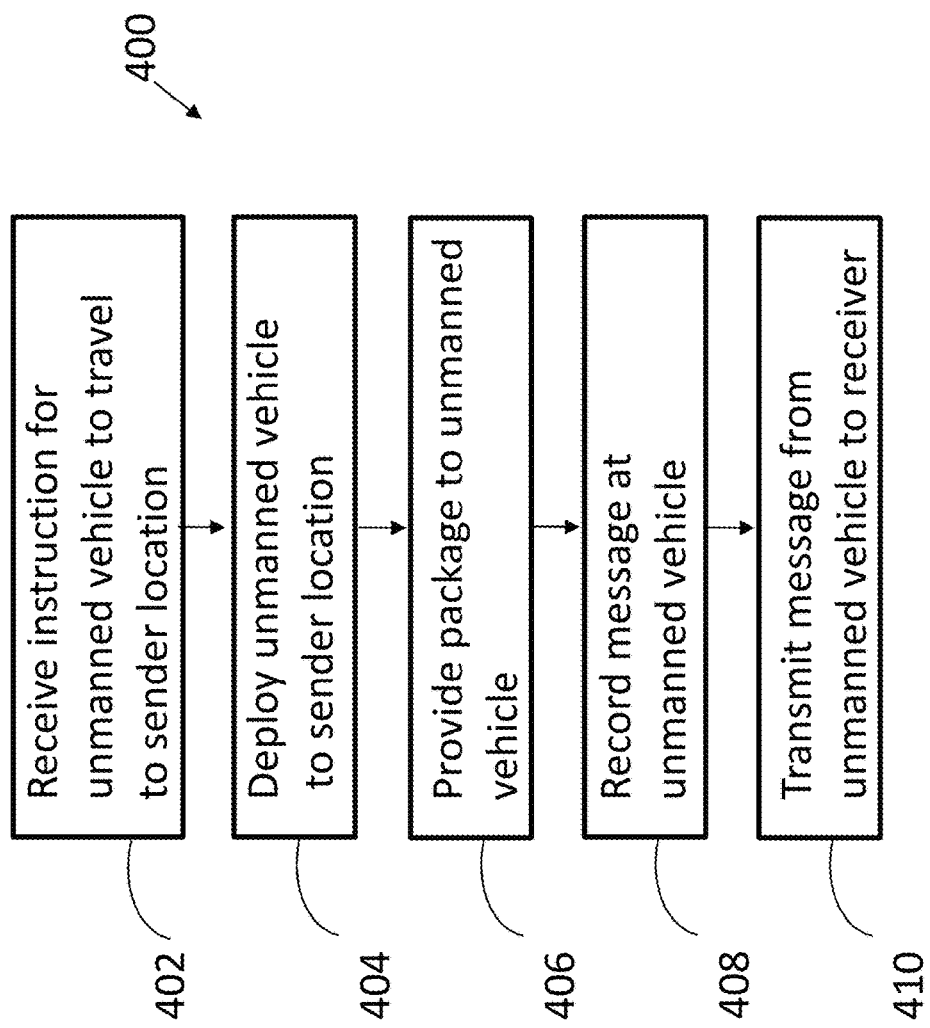
FIG. 6 is a flow diagram of a method for delivery, in accordance with some embodiments.

In some embodiments, for example, shown in block 402 of method 400 of FIG. 6, the unmanned vehicle 14 receives an instruction to travel to a predetermined location where the sender 11 has the package 13. The unmanned vehicle 14 may be configured, for example, to return a package to the sender, or to pick up a package directly from the sender 11.

At block 404, the unmanned vehicle 14 is deployed to the sender location.

At block 406, the sender 11 provides the package 13 to the unmanned vehicle 14. For example, the package 13 may be placed in a payload or delivery box or the like in the unmanned vehicle.

At block 408, the sender 11 may record a message at the unmanned vehicle. For example, when the package 13 is placed in the payload, the unmanned vehicle 14 may automatically begin an electronic recording so that the sender 11 can speak, videotape, type, or otherwise submit a message.

At block 410, the recorded message can be transmitted from the unmanned vehicle 14 to the personal computing device 32 of the receiver 12. For example, the recorded message may state that the package is being delivered to the receiver 12.

The following example illustrates features according to some embodiments. A soldier stationed at a military base purchases an engagement ring for his girlfriend. He may hire a delivery service to deliver the engagement ring to his girlfriend at her home. The delivery may include a prerecorded transmission of a message to be viewed at the time of delivery. Alternatively, he may request that the package be delivered at a specific time, which allows him to speak with her in real-time.

When the package arrives, his girlfriend receives the package from an autonomous delivery vehicle or courier with a special-purpose device, where she is presented with the live transmission or prerecorded transmission. The moment she receives the package, the autonomous delivery vehicle or special-purpose courier device may direct a camera and microphone at her to capture her receiving the package. In the case of a live transmission, the soldier may ask her via the live transmission for her to marry him at the time of delivery, and can see and hear her response. This exchange may be recorded, and stored, viewed, and/or shared at a social media outlet or the like. In the case of a prerecorded transmission made by the soldier, this may be presented to her at the time of delivery, where she can record her reply for delivery to the soldier.

As described herein, some or all of the system and method in accordance with some embodiments implemented in a computer system. The computer system may generally comprise a processor, an input device coupled to the processor, an output device coupled to the processor, and memory devices coupled to the processor via a bus or other signal-carrying connector. The processor may perform computations and control the functions of a computer, including executing instructions included in computer code for the tools and programs capable of implementing a method in the manner prescribed by the embodiments of the figures using the system of the figures, wherein the instructions of the computer code may be executed by processor via memory device. The computer code may include software or program instructions that may implement one or more algorithms for implementing the systems and methods, as described in detail above. The processor may execute the computer code.

A memory device may include input data. The input data includes any inputs required by the computer code. The output device may display output from the computer code. The memory device may be used as a computer usable storage medium (or program storage device) having a computer readable program embodied therein and/or having other data stored therein, wherein the computer readable program comprises the computer code. Generally, a computer program product (or, alternatively, an article of manufacture) of the computer system may comprise said computer usable storage medium (or said program storage device).

Memory devices include any known computer readable storage medium, including those described in detail below. In one embodiment, cache memory elements of memory devices may provide temporary storage of at least some program code in order to reduce the number of times code must be retrieved from bulk storage while instructions of the computer code are executed. Moreover, similar to processor, memory device may reside at a single physical location, including one or more types of data storage, or be distributed across a plurality of physical systems in various forms. Further, memory device can include data distributed across, for example, a local area network (LAN) or a wide area network (WAN). Further, memory device may include an operating system (not shown) and may include other systems not shown.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods. Thus, an embodiment of the present invention discloses a process for supporting computer infrastructure, where the process includes providing at least one support service for at least one of integrating, hosting, maintaining and deploying computer-readable code in a computer system including one or more processor(s), wherein the processor(s) carry out instructions contained in the computer code causing the computer system in accordance with embodiments of the present invention. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of the present invention. Thus, the present invention discloses a process for supporting, deploying and/or integrating computer infrastructure, integrating, hosting, maintaining, and deploying computer-readable code into the computer system, wherein the code in combination with the computer system is capable of performing a method of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for electronic communication between at least two people, comprising:
   a delivery entity operating to deliver a package at a predetermined time from a first person to a second person and to provide an electronic communication in real-time or near real-time between the first person and the second person that is commensurate with the delivery, the delivery entity including an unmanned vehicle, the delivery entity including:
      an integrated electronic display for displaying a first message of the electronic communication from the first person to the second person commensurate with the predetermined time of the delivery of the package to the second person; and
      a transmitter configured to generate and output a second message of the electronic communication generated by the second person during delivery of the package and in response to the displayed first message, the system further comprising:
   an exception handling device that controls the delivery entity when an unexpected event disrupts the commensurate delivery with the electronic communication, wherein the exception handling device controls the delivery entity to deliver the package at a new delivery time corresponding to a delayed delivery caused by the unexpected event.

2. The system of claim 1, wherein the unmanned vehicle includes an autonomous ground vehicle (AGV) or an unmanned aerial vehicle (UAV).

3. The system of claim 1, wherein the delivery entity facilitates the electronic communication between the first person and the second person, including sending a message to the first person when the delivery entity is at an intended location of the second person, then generates a live transmission.

4. The system of claim 1, wherein the electronic communication includes a hologram transmission.

5. The system of claim 4, wherein the real-time electronic communication includes a live transmission of holograms or recorded holographic messages holograms or recorded holographic messages.

6. The system of claim 1, further comprising an onboard recording device constructed and arranged to record messages that will allow the first or second person to make unique customizations to a message of the electronic communication.

7. The system of claim 1, wherein the delivery entity includes a communication device for exchanging the electronic communication with a mobile device of the first person or the second person.

8. The system of claim 7, wherein the mobile device includes an augmented reality device.

9. The system of claim 1, wherein the electronic communication is audio or video.

10. The system of claim 1, wherein the electronic communication is video.

11. The system of claim 1, wherein the delivery entity represents an autonomous courier while also facilitating a real-time or live transmission of the electronic communication between a sender of the electronic communication of the first and second persons and a receiver of the electronic communication of the first and second persons.

12. The system of claim 1, wherein the autonomous vehicle is controlled, modified, or adjusted based on inputs by the first or second person during a delivery.

13. The system of claim 1, wherein messages in the electronic communication are stored in a cloud computing environment for access by the at least two people.

14. The system of claim 1, wherein the electronic display provides for authentication by a user prior to display of the electronic communication.

15. The system of claim 1, wherein the delivery entity automatically sends a message to the first person when the second person is not present to receive the package.

16. The system of claim 1, further comprising an exception handling processor for executing an independent set of processes for controlling the unmanned vehicle when an event occurs that is outside the intended delivery of the package.

17. The system of claim 1, wherein the delivery entity outputs both the electronic communication and a pre-recorded communication in a live transmission.

18. The system of claim 1, wherein the delivery entity includes a smart package.

19. The system of claim 1, wherein the sender controls the unmanned vehicle, and controls a timing of the delivery of the package.

* * * * *